United States Patent [19]

Thornton et al.

[11] Patent Number: 4,732,671

[45] Date of Patent: Mar. 22, 1988

[54] DIESEL FUEL FILTER/WATER SEPARATOR

[75] Inventors: Donald I. Thornton, Warwick, R.I.; Richard H. Peyton, Berkley, Mass.

[73] Assignee: Allied Corporation, Morristown, N.J.

[21] Appl. No.: 892,567

[22] Filed: Aug. 4, 1986

[51] Int. Cl.⁴ .................. B01D 27/08; B01D 35/18
[52] U.S. Cl. .................................... 210/86; 210/90; 210/149; 210/184; 210/238; 210/307; 210/DIG. 5; 210/DIG. 17
[58] Field of Search .......... 210/DIG. 5, DIG. 17, 210/86, 90, 104, 112, 114, 116, 130, 149, 180, 181, 183, 184, 232, 238, 307, 308, 416.4

[56] References Cited

U.S. PATENT DOCUMENTS

| | | | |
|---|---|---|---|
| 3,165,469 | 1/1965 | Bruns et al. | 210/416.4 |
| 4,372,847 | 2/1983 | Lewis | 210/DIG. 5 |
| 4,406,785 | 9/1983 | Siefer | 210/184 |
| 4,423,751 | 1/1984 | Roettgen | 210/130 |
| 4,424,128 | 1/1984 | Shinaver | 210/238 |
| 4,477,715 | 10/1984 | Bell et al. | 210/184 |
| 4,502,955 | 3/1985 | Schaupp | 210/DIG. 5 |
| 4,529,512 | 7/1985 | Williamson et al. | 210/130 |
| 4,571,481 | 2/1986 | Leary | 210/184 |
| 4,596,224 | 6/1986 | Prager | 210/184 |

Primary Examiner—Peter A. Hruskoci
Assistant Examiner—Richard D. Jordan
Attorney, Agent, or Firm—Ken C. Decker; W. N. Antonis

[57] ABSTRACT

A separating device for separating a pair of immiscible components from a fluid mixture, such as separating water from a diesel fuel oil/water mixture, includes a housing and a filter cartridge mounted on the housing such that the filter cartridge is oriented substantially horizontally. The housing includes an inlet fitting, an outlet fitting, and a sump for receiving the fluid component separated from the mixture. Because of the orientation of the housing, the coalesced water or heavier component of the fluid mixture tends to collect in the lower portion of the filter cartridge and drains into the sump, where it may be drained periodically. The lighter component or fuel oil is communicated to the outlet port or fitting.

13 Claims, 5 Drawing Figures

DIESEL FUEL FILTER/WATER SEPARATOR

BACKGROUND OF THE INVENTION

This invention relates to a mechanism for separating immiscible components of a fluid mixture and, more particularly, for separating water from a diesel fuel oil/water mixture.

Although the invention disclosed in this specification can be used to separate immiscible components of any fluid mixture in which the components have different specific gravities, it is more particularly related to the problem of separating water from diesel fuel oil. Diesel engines have become increasingly popular for operating motor vehicles. Although this type of engine provides increased fuel economy over the more traditional gasoline engines, diesel engines are particularly sensitive to contaminates in the fuel oil supply, particularly water mixed with the fuel oil. It is extremely difficult to maintain fuel oil supplies such that they cannot be contaminated by water. Water mixed with fuel oil has many deleterious effects on the vehicle engine, and must be separated out for the proper operation of the diesel engine, particularly in cold weather, when ice crystals may cause the filter to plug. Furthermore, diesel fuel oil contains parafin waxes which, if the fuel oil is chilled below its "cloud point", solidify into crystals, which may plug the fuel oil filter, causing a reduction or loss of fuel flow.

Accordingly, it has become common to provide vehicles equipped with diesel engines with a fuel oil/water separator that causes the fuel oil/water mixture passing through the separator to coalesce, and thus be removed from the mixture, so that the fuel oil communicated to the engine has had its water content removed by the separator. Fuel oil/water separators used in motor vehicles are commonly of the pleated paper type or have some other coalescing and filtering media which effects separation. Accordingly, the media eventually is rendered ineffective or unusable. Therefore, most fuel oil/water separators have a replacable cartridge element which may be periodically removed and discarded and replaced with a fresh cartridge containing fresh coalescing and filtering media. Because of the design of the fuel oil/water separator, prior art fuel oil/water separators have used a cartridge which includes a sump for receiving the water separated from the mixture. Accordingly, it is also necessary with such cartridges to provide a mechanism for draining the sump periodically and it has also become customary to provide such cartridges with a probe which actuates a warning device when the water in the sump reaches a predetermined level. Accordingly, since the replacable cartridge must include the sump, a stopcock or some other means of draining the sump, and a mechanism for installing a water detecting probe, these cartridges have become relatively expensive. Such a prior art diesel fuel oil/water separator is illustrated in U.S. Pat. No. 4,292,179.

SUMMARY OF THE INVENTION

The present invention provides a diesel fuel oil/water separator in which the replaceable filter/coalesce cartridge may be made very inexpensively, since the cartridge contains only the filtering and coalescing media, and does not contain the sump, draining device, and/or water detecting probe. In the device disclosed in the present application, the sump is a part of the base supporting the filter cartridge and providing the inlet and outlet connections therefrom. Accordingly, the sump, draining mechanism and water detecting probe are not replaced each time that the filter/coalesce cartridge is replaced, thereby substantially reducing the cost of the cartridge and considerably facilitating the removal and installation of a new cartridge.

BRIEF DESCRIPTION OF THE DRAWINGS

These and other advantages of the present invention will become apparent from the following specification, with reference to the accompanying drawings, in which.

DESCRIPTION OF THE PREFERRED EMBODIMENT

Figure 1:
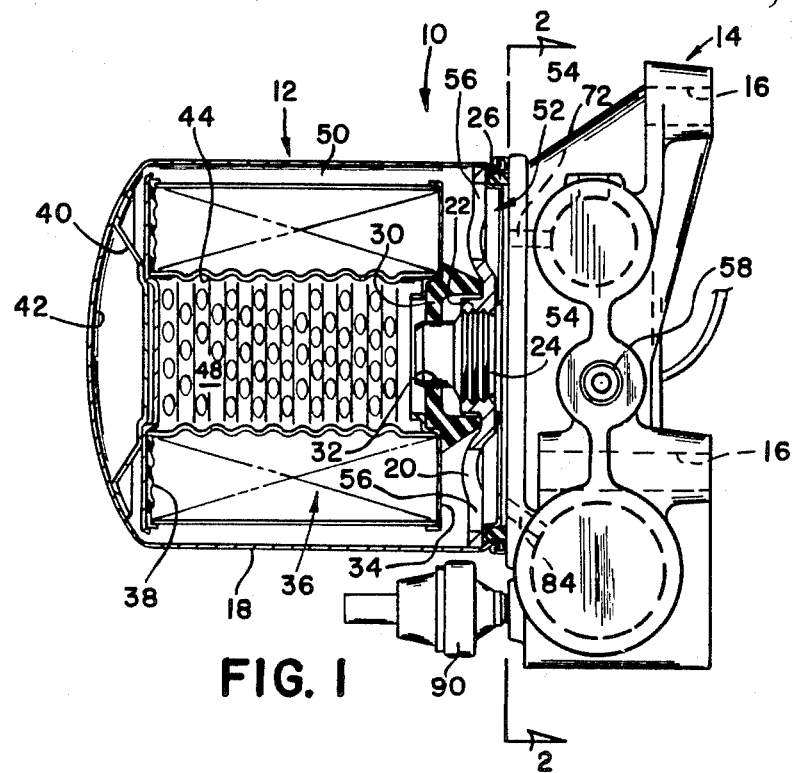
FIG. 1 is a side elevation, partly in section, of a diesel fuel oil/water separator made pursuant to the teachings of the present invention.
Figure 2:
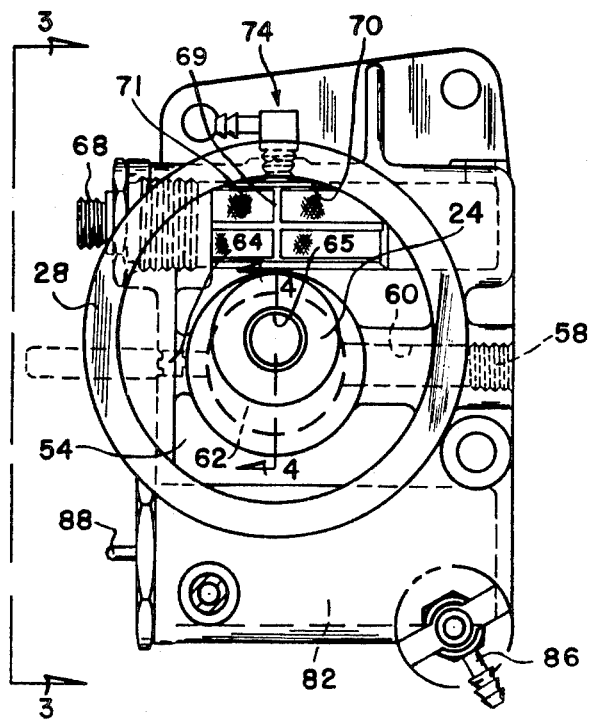
FIG. 2 is a view taken substantially along lines 2—2 of FIG. 1.
Figure 3:
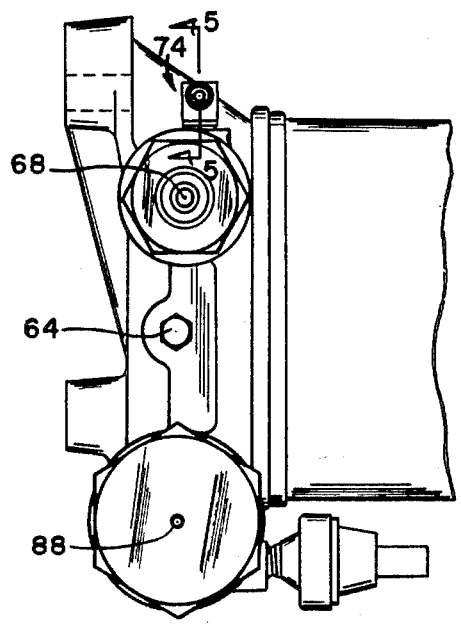
FIG. 3 is a view taken substantially along lines 3—3 of FIG. 2.

Referring now to the drawings, the diesel fuel oil/water separator generally indicated by the numeral 10 includes a removable and replaceable filter/coalescer element generally indicated by the numeral 12 and a permanently mounted base unit 14. The base unit 14 is permanently fixed to the motor vehicle by fasteners received through bores 16 provided in the base unit 14.

The filter element 12 includes a conventional cup-shaped sheet metal housing generally indicated by the numeral 18, the open end of which is closed by a conventional tapping plate 20. The tapping plate 20 includes a threaded apperature as at 22 which is threadably received on a threaded stud 24 to thereby mount the filter element 12 on the base unit 14. Tapping plate 20 further carries a circumferentially extending sealing member 26 at its radially outermost portion thereof which is adapted to sealingly engage a corresponding sealing surface 28 which circumscribes a portion of the base unit 14 to thereby effect a fluidtight connection between the filter element 12 and base unit 14. The tapping plate further carries a resilient seal 30 which includes a projecting portion 32 to engage the stud 24 to thereby effect a fluid-tight connection with the stud. The seal engages lower end cap 34 of a filter media generally indicated by the numeral 36, the opposite end cap 38 engages leaf spring 40 which is located against the closed end 42 of cupshaped member 18. A metallic center tube 44 extends between the end caps to support the filter media generally indicated by the numeral 36. Filter media 36 is a circumferencally extending array of radially tapering pleats defining an axis coaxial with the axis defined by the housing 18, as is conventional in the filter art. The filter media 36 may be made out of, for example, a pleated paper having the appropriate water coalescing properties well known to those skilled in the art. Accordingly, the pleated filtering media 36 divides the interior of the cupshaped member 18 into an inlet chamber 48 which is communicated with the study 24 and an outlet chamber 50 which is communicated with a fluid receiving cavity 52 defined by the tapping plate 20 and a corresponding surface 54 on the base unit 14, and which is circumscribed by the seal 26 and the sealing surface 28. The tapping plate is provided with circumferentially spaced, elongated apertures 56, which are spaced circumferencally around the periphery of the tapping plate 20, to permit communication from the chamber 50 into the fluid receiving cavity 52.

Base unit 14 includes an inlet port 58 which is connected to the inlet fuel line and communicates the latter with a passage 60 into an inlet cavity 62. A valve mechanism 64 can be opened to purge air from the chamber 62 and passage 60 when the unit is initially filled with fluid. Chamber 62 communicates through a heating element generally indicated by the numeral 66 (FIG. 4) which is installed in the inlet cavity 62 so that fuel flows through the heating element 66 before reaching a passage 65 defined within stud 24 of the base 14. The heating element 66 will be described hereinafter. Base unit 14 further includes an outlet fitting 68 which communicates with outlet chamber 70 in base unit 14 which communicates with the fluid receiving cavity 52 through passage 72. Outlet fitting 68 carries an annular support 69 which carries a nylon mesh separating membrane 71 which is received within outlet chamber 70. Screen 71 is conventional and separates the coalesced water droplets from the fuel passage to outlet fitting 68. The outlet fitting 68 is connected to the fuel line which communicates the separator assembly 10 with the vehicle engine. The chamber 70 is communicated with a bleed valve 74 which is more particularly illustrated in FIG. 5. Bleed valve 74 includes a one-way flapper type check-valve 76 which permits air to be vented from the chamber 70 back to the vehicle fuel tank through outlet opening 78.

Base unit 12 further includes a sump 82 which is communicated with the fluid receiving cavity 52 by a passage 84. The sump 82 is equipped with a conventional manually operated draincock 86 to permit fluid to be drained from the sump 82. Furthermore, a conventional probe 88 is installed in the sump 82 to actuate a warning device in the operator's compartment when the level of the fluid in the sump 82 attains a predetermined level. Furthermore, a conventional vacuum switch 90 is installed in the sump 82 to actuate still another warning device in the operator's compartment when a vacuum is pulled in the sump 82, thereby indicating a clogged filter condition. Accordingly, the operator is thereby warned when the filter media 36 becomes clogged and therefore inoperable.

Figure 4:
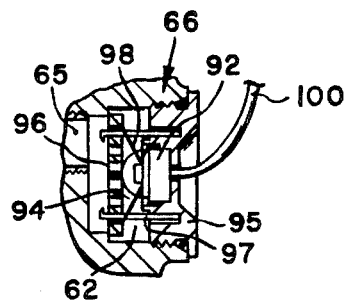
FIG. 4 is a view taken substantially along lines 4—4 of FIG. 2.
Figure 5:
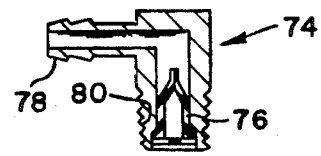
FIG. 5 is a view taken substantially along lines 5—5 of FIG. 3.

Referring now to FIG. 4, the heater element 66 includes a conventional thermostat control 92 which cooperates with a perforated plate 96 to define a fluid passage 94 extending through the cavity 62 to permit fluid to communicate into the passage 65. The perforated plate 96 is supported on plug 95 (which is screwed into the base unit 14) by arms 97 which project from the plug 95. The thermostat control 92 is connected to perforated plate 96 by conducting leafsprings 98, so that electricity supplied to the thermostat through the lead 100 can also be conducted to the plate 96. The plate 96 is made from a positive temperature coefficient (PTC) material well known to those skilled in the art whose temperature can be controlled by the thermostat 92 and which is effective to heat the fluid passing through the perforations in the plate 96.

In operation, fluid communicated to the inlet port 58 is communicated through passage 60 and inlet chamber 62 to the passage 65. Fluid in the chamber 62 is heated by the temperature element 66, if necessary, and is then communicated into the chamber 48. The fluid mixture in chamber 48 is then communicated through the filtering media 36, where the water or other fluid component entrained in the fluid mixture is coalesced into water or fluid droplets. The water droplets collect on the outer surface (viewing FIG. 1) of the filter means 36 and eventually collect and run down the sides of the chamber 50. It will be noted that the filter cartridge 12 is installed such that it is oriented in a substantially horizontal direction, thereby permitting the heavier fluid component, such as water in a diesel fuel oil/water mixture, to collect in the lower part of the chamber 50 (viewing FIG. 1) while the lighter fuel oil accumulates at a level above the water or heavier component. Nevertheless, both the water and the fuel oil are communicated into the fluid receiving cavity 52 through the aperatures 56, but the water or heavier fluid component tends to settle in the lowermost portion of the cavity 52 while the lighter component or fuel oil remains in the upper portion. The coalescent droplets of the heavier components are separated from the mixture by the screen 71 as the fuel communicates through outlet fitting 68.

Accordingly, the lighter component will be communicated through the passage 72 into the outlet chamber 70 and therefore to the outlet fitting or port 68. Similarly, the water or heavier fluid component will be communicated into the sump 82 through the passage 84. The level of the water or heavier component in the cavity 82 may be sensed by the probe 88 and the driver of the vehicle alerted that the sump 82 must be drained by operation of the drain mechanism 86 when necessary.

Since the pressure level in the sump 82 will be indicative of the pressure level in the chamber 50 and therefore be indicative of the pressure level across the filtering media 36, vacuum switch 90 provides a warning to the vehicle operator when the pressure differential across filtering media 36 reaches a level that indicates a clogged or plugged media, thereby alerting the operator that the filter element 12 must be changed.

We claim:

1. Separating device for separating a pair of immiscible components of a liquid mixture, comprising a support housing and a replaceable cartridge, said housing including means for mounting said cartridge on the exterior of said housing, said cartridge including means for effecting coalescence of one of said components, said housing including a sump cavity defined within said support housing, an inlet passage and an outlet passage defined within said support housing, a separating membrane separate from said cartridge and mounted within said support housing, said inlet passage communicating said fluid mixture into said cartridge, said outlet passage communicating one of said components from said cartridge and through said housing, and sealing means defined on said support housing and said cartridge for sealing the support housing to said cartridge, said support housing defining conduit means communicating with said cartridge to communicate the other of said components from said cartridge and into said sump, said cartridge defining a chamber therewithin, said coalescence effecting means including coalescing media in said chamber dividing the chamber into an inlet section communicated with the inlet passage and an outlet section, whereby, after coalescence of said components is effected by said coalescing media, said one component collecting in one portion of the outlet section and said other component collects in another portion of the outlet chamber, said outlet passage communicating with said one portion of the outlet section, the conduit means communicating with the other portion of the outlet section, said coalescing media being an elongated annular array of material for effecting coalescence, said array having an axis, said annular array defining inner and outer circumferences, the inner circumference defining the inlet section and being communicated with the inlet passage, the cartridge including a cartridge housing having an axis coaxial with the axis of said array and having an inner circumference cooperating with the outer circumference of said array to define said outlet section, said axes being oriented so that said other component collects by gravity in said another portion of the outlet section, said axes being oriented sufficiently close to horizontal to permit collection of said other component by gravity in said another portion.

2. Separating device as claimed in claim 1, and a separating membrane in said outlet passage for effecting separation of the coalesced components.

3. Separating device as claimed in claim 1, wherein said cartridge includes an end for sealing engagement with said sealing surface on the support housing when said mounting means mounts said cartridge on the support housing, said end of said cartridge cooperating with said sealing surface to define a compartment therebetween when the cartridge is installed on said support housing, said end defining aperatures communicating said outlet section with said compartment, said conduit means also communicating with said compartment.

4. Separating device as claimed in claim 3, wherein said outlet passage communicates with a section of said compartment and spaced circumferentially from the section with which the conduit means communicates.

5. Separating device as claimed in claim 1, wherein said support housing includes a differential pressure responsive switch responsive to a predetermined low pressure between said sump and atmosphere for actuating a warning device.

6. Separating device as claimed in claim 1, and manually activated drain means carried by said support housing for draining said sump, and vent means on said support housing communicating with said outlet passage to vent the latter during draining of the sump.

7. Separating device as claimed in claim 6, wherein said vent means includes a vent passage, and check valve means permitting communication from said outlet into said vent passage but preventing communication in the reverse direction.

8. Separating device as claimed in claim 1, wherein said inlet passage includes means for heating the liquid mixture communicating through the inlet passage.

9. Separating device as claimed in claim 8, wherein said heating means includes a perforated disc of temperature controlled electrically resistive material in said inlet passage.

10. Separating device as claimed in claim 1, wherein said support housing carries a probe for measuring the liquid level in said sump.

11. Separating device for separating a pair of immiscible components of a liquid mixture, comprising a support housing and a replaceable cartridge, said housing including means for mounting said cartridge on the exterior of said housing, said cartridge including means for effecting coalescence of one of said components, said housing including a sump cavity defined within said support housing, an inlet passage and an outlet passage defined within said support housing, a separating membrane separate from said housing and carried within said support housing, said inlet passage communicating said fluid mixture into said cartridge, said outlet passage communicating one of said components from said cartridge and through said housing, and sealing means defined on said support housing and said cartridge for sealing the support housing to said cartridge, said support housing defining conduit means communicating with said cartridge to communicate the other of said components from said cartridge and into said sump, said cartridge defining a chamber therewithin, said coalescence effecting means including coalescing media in said chamber dividing the chamber into an inlet section communicated with the inlet passage and an outlet section, whereby, after coalescence of said components is effected by said coalescing media, said one component collecting in one portion of the outlet section and said other component collects in another portion of the outlet section, said outlet passage communicating with said one portion of the outlet section, the conduit means communicating with the other portion of the outlet section, said coalescing media being an elongated annular array of material for effecting coalescence, said array having an axis, said annular array defining inner and outer circumferences, the inner circumference defining the inlet section and being communicated with the inlet passage, the cartridge including a cartridge housing having an axis coaxial with the axis of said array and having an inner circumference cooperating with the outer circumference of said array to define said outlet section, said axes being oriented so that said other components collects by gravity in said another portion of the outlet section, said cartridge housing including an end member offset axially with respect to said annular array and extending substantially radially from said axis, said sealing means including a sealing surface on the exterior of said support housing and a circumferentially extending seal carried on said end member and circumscribing said axis to define a circumscribed portion on said end member, said seal engaging said sealing surface when the cartridge is installed on the support housing, said end member defining passages communicating with said inlet passage, said outlet passage and said conduit means respectively, said outlet passage being offset circumferentially with respect to said axis from said conduit means.

12. Separating device as claimed in claim 11, wherein said axes are oriented sufficiently close to horizontal to permit collection of said other component, by gravity in said another portion.

13. Separating device as claimed in claim 11, wherein said support housing includes a threaded post projecting from said sealing surface, said post defining at least a portion of said inlet passage and being coaxial with said axis when the cartridge is installed on the support housing, said end member defining a threaded portion defining at least a portion of the entry passage, said cartridge being mounted on said support housing through the threaded engagement of the post and the entry passage.

* * * * *